(12) United States Patent
Varghese et al.

(10) Patent No.: US 11,494,479 B2
(45) Date of Patent: Nov. 8, 2022

(54) AUTHENTICATED COMPONENT PERMISSIONS FRAMEWORK

(71) Applicant: HARMAN INTERNATIONAL INDUSTRIES, INCORPORATED, Stamford, CT (US)

(72) Inventors: Eugine Thomas Varghese, Novi, MI (US); Sreejit Gopinath, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 225 days.

(21) Appl. No.: 16/548,771

(22) Filed: Aug. 22, 2019

(65) Prior Publication Data

US 2020/0074067 A1 Mar. 5, 2020

Related U.S. Application Data (60) Provisional application No. 62/725,866, filed on Aug. 31, 2018.

(51) Int. Cl.
*H04L 29/06* (2006.01)
*G06F 21/44* (2013.01)

(52) U.S. Cl.
CPC .................. *G06F 21/44* (2013.01)

(58) Field of Classification Search
CPC ....... H04L 9/3247; H04L 9/3263; H04L 9/32; G06F 21/10; G06F 21/121
See application file for complete search history.

(56) References Cited

U.S. PATENT DOCUMENTS

| | | | |
|---|---|---|---|
| 7,802,294 B2 * | 9/2010 | Perlin | G06F 21/6218 713/172 |
| 9,021,267 B2 | 4/2015 | Neumann | |
| 2003/0051169 A1 * | 3/2003 | Sprigg | G06F 21/53 713/185 |
| 2013/0160147 A1 | 6/2013 | Draluk et al. | |
| 2015/0006901 A1 * | 1/2015 | Neumann | H04L 9/3247 713/176 |
| 2017/0344731 A1 | 11/2017 | Gefflaut et al. | |

FOREIGN PATENT DOCUMENTS

CN 106991298 A 7/2017

OTHER PUBLICATIONS

Extended European Search Report for application No. 19193873.7 dated Jan. 7, 2020.

* cited by examiner

*Primary Examiner* — Jason K Gee
(74) *Attorney, Agent, or Firm* — Artegis Law Group, LLP (57) ABSTRACT

Various embodiments set forth techniques for managing access to a resource at a device. In one aspect, a method includes receiving a request by an application to access a resource, determining that an application permission associated with the application and the resource grants the application access to the resource, where the application permission includes a signature of a permission review entity associated with the resource, and granting the request to access the resource based on the application permission. The permission review entity associated with the resource may be authorized through device permissions specified by an implementer or provider of the device.

20 Claims, 5 Drawing Sheets

AUTHENTICATED COMPONENT PERMISSIONS FRAMEWORK

CROSS-REFERENCE TO RELATED APPLICATION

This application claims the priority benefit of the United States Provisional Application titled "AUTHENTICATED COMPONENT PERMISSIONS FRAMEWORK," filed on Aug. 31, 2018 and having Ser. No. 62/725,866. The subject matter of this related application is hereby incorporated herein by reference.

BACKGROUND

Field of the Various Embodiments

The various embodiments relate generally to computing systems and, more specifically, to an authenticated component permissions framework.

Description of the Related Art

A computing device or system may include many resources, such as various sub-systems and/or services, which may be accessed for various purposes. For example, a vehicle may have an engine sub-system, a braking sub-system, various sensors, various services, and so forth. The system may be implemented with an interface to the sub-systems and/or services (e.g., applications) that can access the sub-systems and sub-services, thereby facilitating monitoring of and/or interaction with the sub-systems and services.

In general, a computing device or system may be implemented as a closed environment or an open environment. Applications allowed into a closed environment are typically limited to applications provided by the provider or implementer of the system. A closed environment approach may provide a provider or implementer of the closed environment more control over the system. A drawback of a closed environment is that innovation in utilization of the sub-systems and services within is limited. For example, the provider or implementer of the closed environment may foreclose development of applications that access certain resources and/or suppress competitor applications that compete with the provider or implementer's offering, thus limiting feature differentiation and accordingly limiting innovation.

On the other hand, applications allowed in an open environment or platform may include applications developed by third parties outside of the control of the provider or implementer of the system. Access by these third-party applications to sub-systems and/or services may be governed by a permissions regime. For example, a third-party application in a vehicle may require permission to access a state of the parking brake of the vehicle and another permission to toggle the parking brake.

One drawback of current approaches to application permissions is that such approaches typically place the burden of managing permissions on the user of the system. For example, the user of the system may be expected to audit and decide on permission requests at the time of application installation or usage. Given the complexity of many sub-systems and services, approvals and/or denials of permission requests are prone to error, for example, due to a lack of knowledge regarding the workings of the sub-systems and services requesting the permissions. Errors in the approval or denial of permission requests may therefore hinder the functionality of the applications and, thus, reduce their utility. A response to this drawback is to have the system provider or implementer define and audit permissions. However, this approach has similar drawbacks as the closed environment discussed above, and further has the drawback of requiring a single entity to bear the burden of managing and auditing permissions for a multitude of applications.

As the foregoing illustrates, what is needed are more effective techniques for managing permissions within a system.

SUMMARY

One embodiment sets forth a method for managing access to a resource at a device. The method includes receiving a first request by a first application to access a resource, determining that a first application permission associated with the first application and the resource grants the first application access to the resource, where the first application permission includes a first signature of a first permission review entity associated with the resource, and granting the first request to access the resource based on the first application permission.

Further embodiments provide, among other things, a system and one or more non-transitory computer readable storage media configured to implement the method set forth above.

At least one advantage of the disclosed techniques is that permissions requested by third-party applications at a computing device may be approved without requiring a direct response by a user. Accordingly, the level of knowledge required by users to utilize third-party applications may be reduced.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
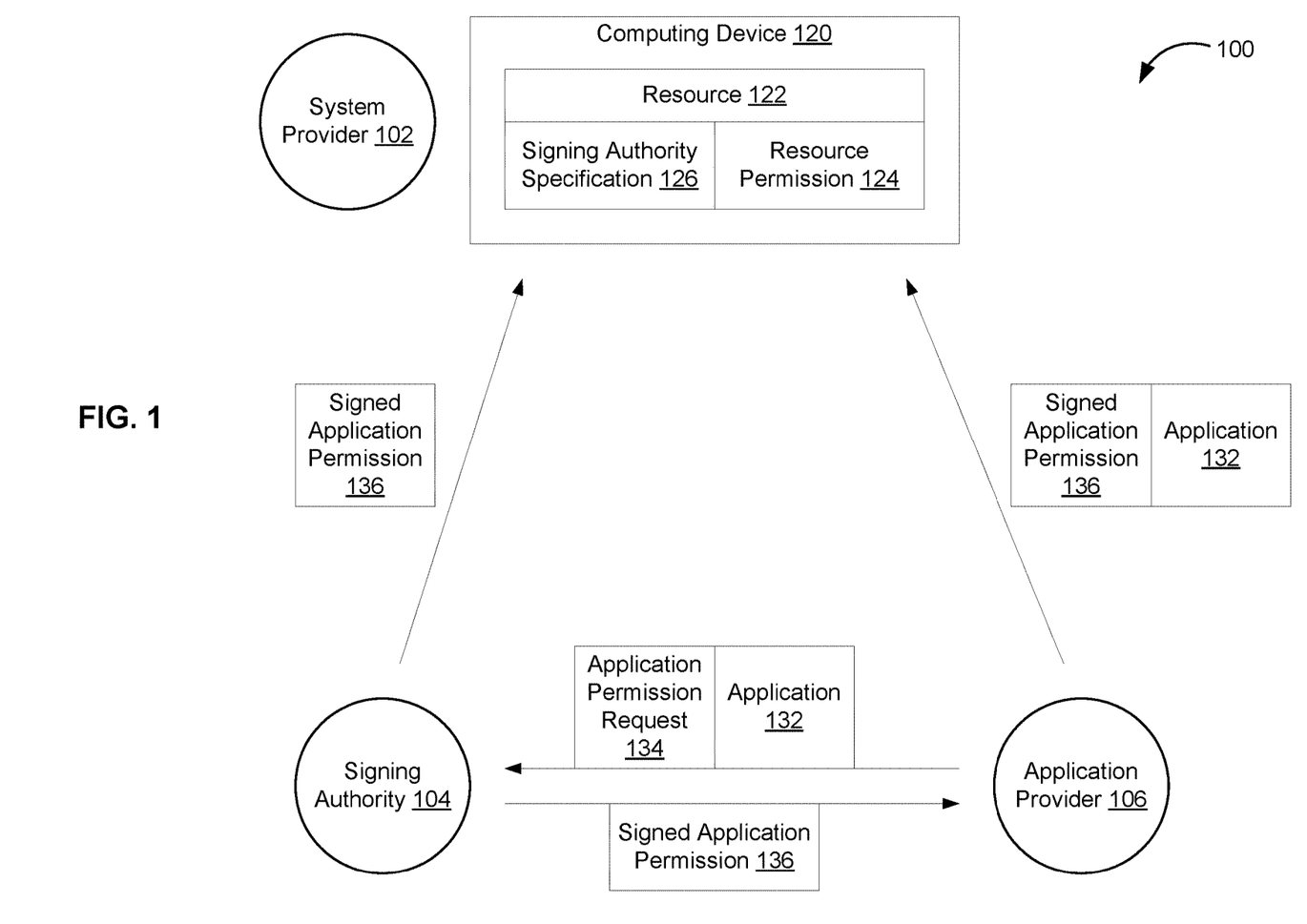
FIG. 1 illustrates a resource permissions framework, according to one or more aspects of the various embodiments.

FIG. 1 illustrates a resource permissions framework 100, according to one or more aspects of the various embodiments. Framework 100 includes a system provider 102, signing authority 104, and an application provider 106. System provider 102 is an entity that implements a computing device or system 120. For example, system provider 102 may be a designer and/or a manufacturer of computing device 120.

Computing device 120 includes one or more resources 122. As used herein, a resource within a computing device or system may be any state, data, operation, or service in the computing device or system, including any state, data, operation, or service associated with any sub-system or component associated with the computing device or system, that may be accessed by an application or module. For example, an in-vehicle system may include a parking brake sub-system for monitoring and controlling the parking brake of the vehicle. The parking brake sub-system may provide access to a state of the parking brake (e.g., engaged or disengaged) and to an operation to change the state of parking brake—each of the state of the parking brake and the operation to change the parking brake state is a resource in the in-vehicle system.

A resource permission 124 may be defined for a resource 122. Resource permission 124 specifies a requirement that permission is required for access to resource 122 by any application or module—an application or module cannot access the resource unless that application or module is granted permission to do so. Resource permission 124 may also include definitions of conditions, constraints, and/or policies on access to the resource 122 by an application or module. The conditions, constraints, and/or policies may specify, for example, when or how the resource may be accessed, and/or restrictions on usage of the resource permission 124 to a certain date range, region, device model, etc. For example, a resource permission for accessing a state of the parking brake (in particular, accessing the state in a read-only manner) may include no conditions and require simply that an application has permission to read the parking brake state. On the other hand, a resource permission for accessing an operation to change the parking brakes state, which may also include accessing the state of the parking brake in a read/write manner, may define one or more conditions or constraints on that access (e.g., the vehicle must be stopped in order to access the operation) in addition to the requirement for the permission. Accordingly, a condition or constraint associated with a permission may serve as a situational denial or revocation of the permission for an application or module.

One or more signing authorities may be specified in a signing authority specification 126 associated with a given resource permission 124 for a resource 122. Signing authority specification 126 associated with a given resource permission 124 specifies (e.g., lists) one or more signing authorities that are designated as authorized to review requests for permissions by applications or modules to access resource 122 in accordance with the given resource permission 124. The specified signing authorities are further authorized to grant and/or deny permissions to the requesting applications/modules based on the reviews and to sign (e.g., digitally signing) the grants and/or denials of permissions. A request by an application or module for permission to access the given resource 122 is to be reviewed, and a response to the request is to be signed by any of the signing authorities specified in signing authority specification 126. Signing authority specification 126 may vary per resource permission 124 and/or per group of resource permissions 124 (e.g., resource permissions associated with a first sub-system may have a signing authority specification in common, and resource permissions associated with a second, different sub-system may have a different signing authority specification in common).

A signing authority 104 is an entity that, as described above, may review, respond to, and sign responses to requests for permissions 124 for access to resources 122. In some embodiments, a signing authority 104 may be system provider 102, a sub-entity of (e.g., a department of) system provider 102, or an entity separate from system provider 102. To respond to a permission request, signing authority 104 may perform a human review and/or a computer-performed analysis (e.g., according to an algorithm) of the permission request. Signing authority 104 may, as part of the human review and/or computer-performed analysis, define and/or specify one or more conditions, constraints, and/or policies on access to resource 122 as part of the response. Additionally or alternatively, signing authority 104 may include with the response conditions, constraints, and/or policies already defined for resource permission 124 described above. In some embodiments, system provider 102 may delegate to a signing authority 104 the responsibility of defining resource permission 124 and any associated access conditions, constraints, and/or policies for a given resource 122 and/or a group of resources 122. Signing authority 104 may digitally sign a response to a permission request by issuing a digital certificate (e.g., an attribute certificate) (not shown) and associating the response with the digital certificate, where the digital certificate identifies signing authority 104 as the issuer.

In various embodiments, resource permission 124 and signing authority specification 126 may be defined and/or specified in a device permission descriptor. As used herein, a device permission descriptor is a data structure configured to hold information associated with resource permission 124 and signing authority specification 126. A device permission descriptor may include a resource permission 124 and an associated signing authority specification 126 for one or more resources. Device permission descriptors may be deployed by system provider 102 and/or a signing authority 104 (e.g., via a data push over a network, via local installation from non-volatile storage media). Device permission descriptors are further described below.

An application provider 106 is an entity (e.g., an application developer) that implements (e.g., develops) an application 132 that may attempt to access resource 122 in operation. Application provider 106 has knowledge that a resource permission 124 has been defined for resource 122. For example, application provider 106 may have obtained documentation (e.g., developer guidelines associated with computing device 120, documentation for an application programming interface (API) associated with resource 122, etc.), prepared by system provider 102, describing information associated with resource permission 124.

Application provider 106 may submit application 132 and an application permission request 134 to a signing authority 104 for review. Permission request 134 is a request that application 132, in particular installations of application 132 on computing devices 120, be granted permission, in accordance with resource permission 124, to access resource 122 in operation. Application permission request 134 may include an application permission descriptor that indicates the permission being requested. As used herein, an application permission descriptor is a data structure configured to hold information associated with a permission associated with an application. An application permission descriptor may include information indicating, among other things, the application and the resource for which permission to access is desired. Application permission descriptors are further described below.

Application 132 and application permission request 134 are reviewed by the signing authority 104 to which the request was submitted. For example, signing authority 104 may analyze application 132 and the requested permission regarding the reasons for accessing the resource, how the access is performed, how the access will be used, security and privacy concerns associated with the access, etc. The signing authority 104 may, based on the review, grant or deny the permission to application 132. Signing authority 104 may generate a digitally signed application permission 136 that indicates the grant or denial of the requested permission and associate signed application permission 136 with application 132. That is, signed application permission 136 is the response by signing authority 104 to application permission request 134. Signing authority 104 may include one or more conditions, constraints, and/or policies in signed application permission 136. In various embodiments, signed application permission 136 may be an application permission descriptor that is signed by signing authority 104.

Signing authority 104 may provide signed application permission 136 to application provider 106 and/or deploy signed application permission 136 to computing device(s) 120 (e.g., via a data push over a network, via local installation from non-volatile storage media). Application provider 106 may deploy signed application permission 136 to computing devices 120 along with application 132 (e.g., via an application distribution platform, such as an app store or the like) and/or separately (e.g., via a data push over a network, via local installation from non-volatile storage media). Accordingly, signing authority 104 and/or application provider 106 may deploy signed application permission 136 to computing devices 120.

At a computing device 120, application 132 may be installed (e.g., in accordance with a user request). When application 132 is installed at computing device 120, signed application permission 136 for permission 124 is validated against signing authority specification 126 for resource permission 124 by verifying that signed application permission 136 is signed by a signing authority specified in that signing authority specification 126. If the signing authority for signed application permission 136 is not a signing authority specified in that signing authority specification 126, then signed application permission 136 is rejected. If the signing authority for signed application permission 136 is a signing authority specified in that signing authority specification 126, then signed application permission 136 may be stored in computing device 120. When installed application 132 attempts to access resource 122 in operation, application 132 is allowed or denied access to resource 122 in accordance with signed application permission 136.

In some embodiments, resource permissions 124, signing authority specifications 126, and/or signed application permissions 136 may be updated. For example, system provider 102 may wish to add or remove a signing authority as a reviewer for requests for permissions to access certain resources. As another example, system provider may wish to add a constraint to access to a resource 122. As a further example, a signing authority may wish to revoke the permission given to an application to access a certain resource because security and/or privacy risks associated with the application was discovered after the permission was given. Updates to resource permissions 124, signing authority specifications 126, and/or signed application permissions 123 may be made and deployed to computing devices 120. Accordingly, permissions may be granted or revoked via these updates.

Figure 2:
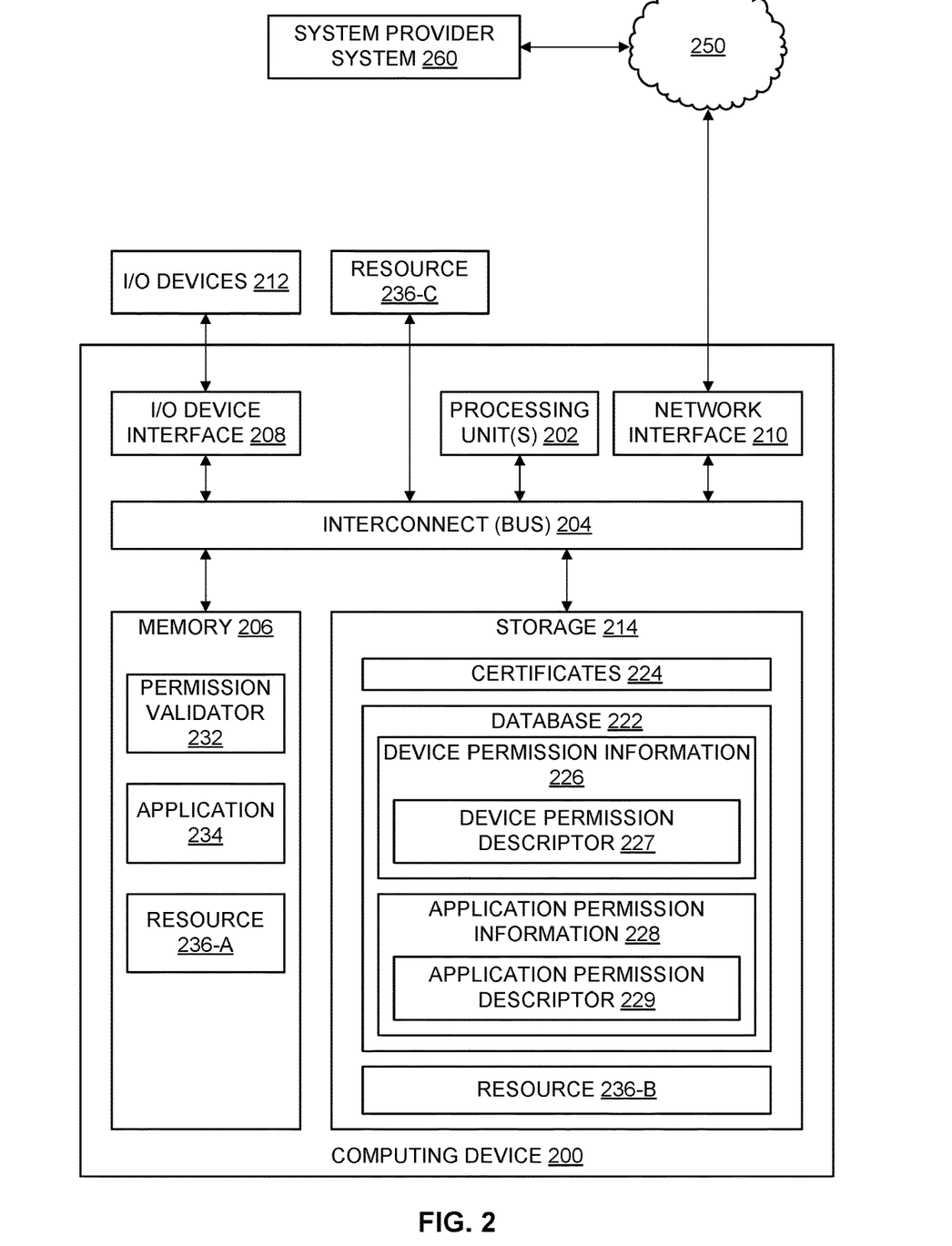
FIG. 2 illustrates a computing device configured to implement one or more aspects of the various embodiments.

FIG. 2 illustrates a computing device 202 (e.g., computing device 120) configured to implement one or more aspects of the various embodiments. Computing device 202 may be a desktop computer, a laptop computer, a smartphone, a personal digital assistant (PDA), a tablet computer, a smart speaker, or any other type of computing device or system suitable for practicing one or more aspects of the various embodiments. In some embodiments, computing device 202 is a component of, or integrated with, a head unit of a vehicle. For example, computing device 202 could be a computing device that implements an infotainment system within the vehicle. It is noted that the computing device described herein is illustrative and that any other technically feasible configurations fall within the scope of the various embodiments.

As shown, computing device 202 includes, without limitation, an interconnect (bus) 204 that connects one or more processing units 202, an input/output (I/O) device interface 208 coupled to one or more input/output (I/O) devices 212, memory 206, a storage 214, and a network interface 210. Processing unit(s) 202 may be any suitable processor, such as a central processing unit (CPU), a graphics processing unit (GPU), an application-specific integrated circuit (ASIC), a field programmable gate array (FPGA), any other type of processing unit, or a combination of multiple processing units, such as a CPU configured to operate in conjunction with a GPU. In general, processing unit(s) 202 may be any technically feasible hardware unit capable of processing data and/or executing software applications and modules.

I/O devices 212 may include devices capable of providing input, such as a keyboard, a mouse, a touch-sensitive screen, buttons, knobs, dials, joysticks, and so forth, as well as devices capable of providing output, such as a display device, audio speaker, etc. Additionally, I/O devices 212 may include devices capable of both receiving input and providing output, such as a touchscreen, a universal serial bus (USB) port, and so forth.

Storage 214 may include non-volatile storage for applications, software modules, and data, and may include fixed or removable disk drives, flash memory devices, and CD-ROM, DVD-ROM, Blu-Ray, HD-DVD, or other magnetic, optical, or solid state storage devices. Permission validator 232 and application 234 may reside in storage 214 and may be loaded into memory 206 when executed. Additionally, in various embodiments, certificates 224, device permission information 226, and application permission information 228 may be stored in storage 214 (e.g., in a database 222).

Memory 206 may include a random access memory (RAM) module, a flash memory unit, or any other type of memory unit or combination thereof. Processing unit(s) 202, I/O device interface 208, and network interface 210 are configured to read data from and write data to memory 206. Memory 206 includes various software programs and modules (e.g., an operating system, one or more applications) that can be executed by processing unit(s) 202 and application data (e.g., data loaded from storage 214) associated with said software programs.

In some embodiments, computing device 200 is coupled to one or more networks 250. Network 250 may be any technically feasible type of communications network that allows data to be exchanged between computing device 200 and external system or devices, such as a server, a cloud computing system, or other networked computing device or system. For example, network 250 may include a wide area network (WAN), a local area network (LAN), a wireless network (e.g., a Wi-Fi network), and/or the Internet, among others. Computing device 200 may connect with network(s) 250 via network interface 216. In some embodiments, network interface 210 is hardware, software, or a combination of hardware and software, that is configured to connect to and interface with network(s) 250.

Computing device 200 further includes one or more resources 236 (e.g., resource 122). As described above, a resource within a computing device or system may be any state, data, operation, or service in the computing device or system, including any state, data, operation, or service associated with any sub-system or component associated with the computing device or system, that may be accessed by an application or module.

Accordingly, computing device 200 may include one or more of a resource 236-A residing in memory 206 (e.g., a piece of application data or a function call loaded into memory 206), a resource 236-B residing in storage 214 (e.g., data stored in storage 214), and/or a resource 236-C associated with a device or component coupled to computing device 200 via interconnect 204 (e.g., a state of a component, an operation to change the state of the component).

One or more applications 234 may be installed onto computing device 200. An application 234 (e.g., application 132) is a software program that can perform various operations to facilitate a defined functionality. An application 234 may be developed by an application provider 106. In operation, application 234 may attempt to access any number of resources 236 in order to facilitate the functionality. For example, an application 234 may provide a user interface to a sub-system associated with computing device 200, including providing information associated with an interaction with the sub-system. Applications 234 may be deployed by application provider 106 to computing device 200 in any technically feasible manner (e.g., via an app store, via data push over network 250, via installation from a non-volatile storage medium). An installed application 234 may be stored in storage 214 and, when executed by computing device 200, loaded into memory 206. When an application 234 is installed, computing device 200 may validate application 234, by verifying one or more digital signatures of application 234 against certificates 224, in order to verify the authenticity and legitimacy of application 234 and/or application provider 106. Application 234 may be successfully installed (e.g., store in storage 214) if application 234 is validated. In some embodiments, installation of applications 234 (including validation) may be performed by an application package manager module, which may be a module of the operating system or an application deployment and management application (e.g., an app store application), in computing device 200.

Computing device 200 further includes a permission validator 232. In operation, permission validator 232 validates digital signatures of data received by computing device 200, in particular signatures of permission information (e.g., device permission information 226 and application permission information 228). In some embodiments, permission validator 232 may be a module of the operating system of computing device 200. In some other embodiments, permission validator 232 may be an application stored in storage 214 in computing device 200 and loaded into memory 206 when executed.

Certificates 224 may be stored in storage 214 (e.g., in a certificates database). Certificates 224 include digital certificates (e.g., attribute certificates) that may be used to verify signatures of applications 234 and permission information (e.g., device permission information, application permission information 228). Certificates 224 may include one or more certificates deployed to computing device 200 by system provider 102 and/or other trusted entities.

Device permission information 226 and application permission information 228 may be stored in storage 214 (e.g., in a database 222). Device permission information 226 includes one or more device permission descriptors 227. In various embodiments, a device permission descriptor 227 includes one or more resource permissions 124 and one or more associated signing authority specification 126. Device permission descriptor 227 may be stored in any technically feasible format (e.g., as a database row with multiple fields, as a set of attribute-value pairs, etc.). In some embodiments, a device permission descriptor 227 may include information identifying the associated resource 122, information corresponding to resource permission 124 indicating that permission is required to access the resource a signing authority specification 126, definitions of one or more access conditions, constraints, and/or policies, one or more digital signatures (e.g., signature by system provider 102), optionally a timestamp of device permission descriptor 227 indicating a generation date of the descriptor, optionally an expiration date, and optionally additional identifying and/or classifying information (e.g., information indicating a sub-system or component with which resource 122 is associated, information indicating a permission type or category with which resource permission 124 is associated).

In some embodiments, a resource permission 124 may be associated with multiple signing authorities authorized to review requests for the resource permission 124. Accordingly, multiple device permission descriptors 227 may have the same resource permission 124. The multiple signing authorities may be specified in the multiple device permission descriptors 227, with each of the multiple device permission descriptors 227 including a signing authority specification 126 specifying one of the multiple signing authorities. Additionally or alternatively, a device permission descriptor 227 may include a signing authority specification 126 that specifies the multiple signing authorities.

Device permission descriptors 227 may be deployed by system provider 102 to computing device 200. For example, device permission descriptors 227 may be added to computing device 200 at manufacturing. Further, device permission descriptors 227 may be deployed to computing devices 200 via network 250 (e.g., received from a system 260 (e.g., a cloud computing system) associated with system provider 102). Additionally, computing device 200 may receive a device permission descriptor 227 from a local storage medium (not shown) (e.g., a USB flash drive coupled to I/O device interface 208). In some embodiments, device permission descriptors 227 may be deployed in groups or bundles to computing devices 200. For example, device permission descriptors 227 associated with the same resource 122, the same resource permission 124, and/or the same sub-system or component may be grouped together and deployed as a bundle or block. Further details regarding obtaining a device permission descriptor 227 are described below in conjunction with FIG. 3.

Application permission information 228 includes one or more application permission descriptors 229. An application permission descriptor 229 is associated with an application 234. In various embodiments, an application permission descriptor 229 includes one or more signed application permissions 136. Application permission descriptor 229 may be stored in any technically feasible format (e.g., as a database row with multiple fields, as a set of attribute-value pairs, etc.). In some embodiments, an application permission descriptor 229 may include an information identifying an application 234 (e.g., application name, application version), an identifier of application provider 106 of application 234, information identifying a resource permission 124 associated with application 234 (including any constraints, conditions, and/or policies), an indicator of a status of the resource permission 124 with respect to application 234 (e.g., permission granted or denied), one or more digital signatures (e.g., signature by a signing authority 104, signature by application provider 106 of application 234), optionally a timestamp of application permission descriptor 229 indicating a generation date of the descriptor and/or a date when the signing authority performed the review of the corresponding request, optionally an expiration date, and optionally additional identifying and/or classifying information, which may be used to identify application 234 (e.g., information indicating a sub-system or component with which application 234 is associated, information indicating a permission type or category with which resource permission 124 is associated).

Computing device 200 may receive one or more application permission descriptors 229 bundled along with an application 234 to be installed. Additionally or alternatively, computing device 200 may receive one or more application permission descriptors 229 separately from application 234. Application permission descriptor 229 may be received from application provider 106 or signing authority 104. In some embodiments, application permission descriptors 229 may be deployed in groups or bundles to computing devices 200. For example, multiple application permission descriptors 229 associated with the same application 234 may be grouped together and deployed as a bundle or block, which may be deployed separately from or together with application 234. Further details regarding obtaining an application permission descriptor 229 are described below in conjunction with FIG. 4.

Figure 3:
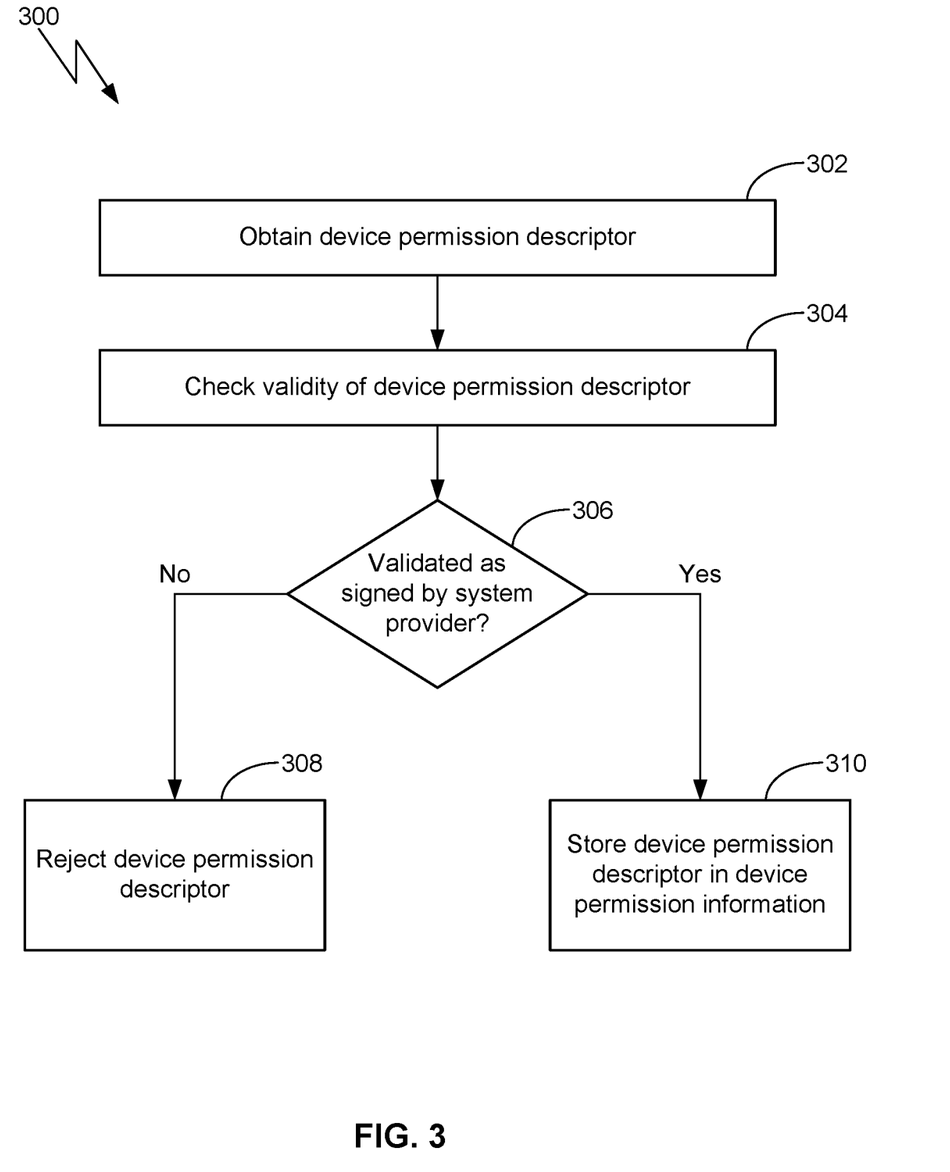
FIG. 3 illustrates a flow diagram of method steps for obtaining a device permission descriptor, according to one or more aspects of the various embodiments.

FIG. 3 illustrates a flow diagram of method steps for obtaining a device permission descriptor, according to one or more aspects of the various embodiments. Although the method steps are described in conjunction with the systems of FIGS. 1-2, persons skilled in the art will understand that any system configured to perform the method steps, in any order, falls within the scope of the various embodiments.

As shown in FIG. 3, a method 300 begins at step 302, where computing device 200 obtains a device permission descriptor 227. Computing device 200 (e.g., permission validator 232 in particular) may receive one or more device permission descriptors 227 via, for example, network 250 (e.g., from system provider system 260 associated with system provider 102) or a local storage medium (e.g., a USB flash drive coupled to I/O device interface 208). Device permission descriptor 227 may include a digital signature. Device permission descriptor 227 includes a resource permission 124 for a resource 122, and a signing authority specification 126 associated with resource permission 124. Device permission descriptor 227 may further include one or more digital signatures.

At step 304, permission validator 232 checks the validity of device permission descriptor 227. In various embodiments, permission validator 232 checks the validity of device permission descriptor 227 by verifying whether device permission descriptor 227 is digitally signed by system provider 102 (e.g., includes a valid digital signature by system provider 102) to ensure that device permission descriptor 227 is authentic and properly provided by system provider 102. Permission validator 232 may verify the signature by retrieving a valid certificate associated with system provider 102 from certificates 224 and checking the signature against the certificate associated with system provider 102.

At step 306, if permission validator 232 determines that the device permission descriptor 227 obtained in step 302 is invalid (step 306—no) (e.g., permission validator 232 determines that device permission descriptor 227 is not signed at all, device permission descriptor 227 is not signed by system provider 102, or the signature has expired), then method 300 proceeds to step 308, where permission validator 232 rejects the obtained device permission descriptor 227. In some embodiments, that rejection includes permission validator 232 discarding the obtained device permission descriptor 227 and not storing the obtained device permission descriptor 227 in device permission information 226 in storage 214. Accordingly, if a version of device permission descriptor 227 already exists in device permission information 226, that version is maintained and not updated (e.g., not replaced) by the device permission descriptor 227 obtained in step 302. In some embodiments, if a given resource 122 and/or resource permission 124 does not have a corresponding device permission descriptor 227 in storage 214, then resource 122 is inaccessible by applications 234 at computing device 200.

If permission validator 232 determines that device permission descriptor 227 is valid (step 306—yes) (e.g., permission validator 232 determines that device permission descriptor 227 is signed by system provider 102 and the signature has not expired), then method 300 proceeds to step 310, where permission validator 232 stores device permission descriptor 227 in device permission information 226 in storage 214. Storing device permission descriptor 227 in device permission information 226 may include updating an existing version of device permission descriptor 227 (e.g., a version associated with the same resource permission 124 and the same resource 122) included in device permission information 226 with the obtained device permission descriptor 227. The updating may include, for example, adding or removing conditions associated with resource permission 124 and/or updating signing authority specification 126. In some embodiments, the updating includes replacing the existing version of device permission descriptor 227 with the version obtained in step 302. Accordingly, method 300 facilitates deployment of new and updated resource permissions 124, including any associated conditions/constraints/policies, and associated signing authority specifications 126, by system provider 102 to computing device 200.

In some embodiments, permission validator 232 may re-evaluate device permission information 226 periodically and/or an update to certificates 224. For example, permission validator 232 may re-evaluate device permission information 226 to determine whether any device permission descriptor 227 within has expired and/or includes a signature associated with a revoked or expired certificate. If such a device permission descriptor 227 is found, then permission validator 232 may mark that device permission descriptor 227 as invalid and/or remove that device permission descriptor 227 from storage 214. It should be appreciated that device permission descriptors 227 may be validated using any technically feasible mechanism (e.g., as required by system provider 102), whether via digital signatures as described above or via another mechanism. If device permission descriptors 227 are validated via digital signatures, as described above, then a device permission descriptor 227 is required to include a digital signature in order to be validated. That is, a device permission descriptor 227 without a digital signature is invalid and may be rejected as described above in conjunction with step 308.

Figure 4:
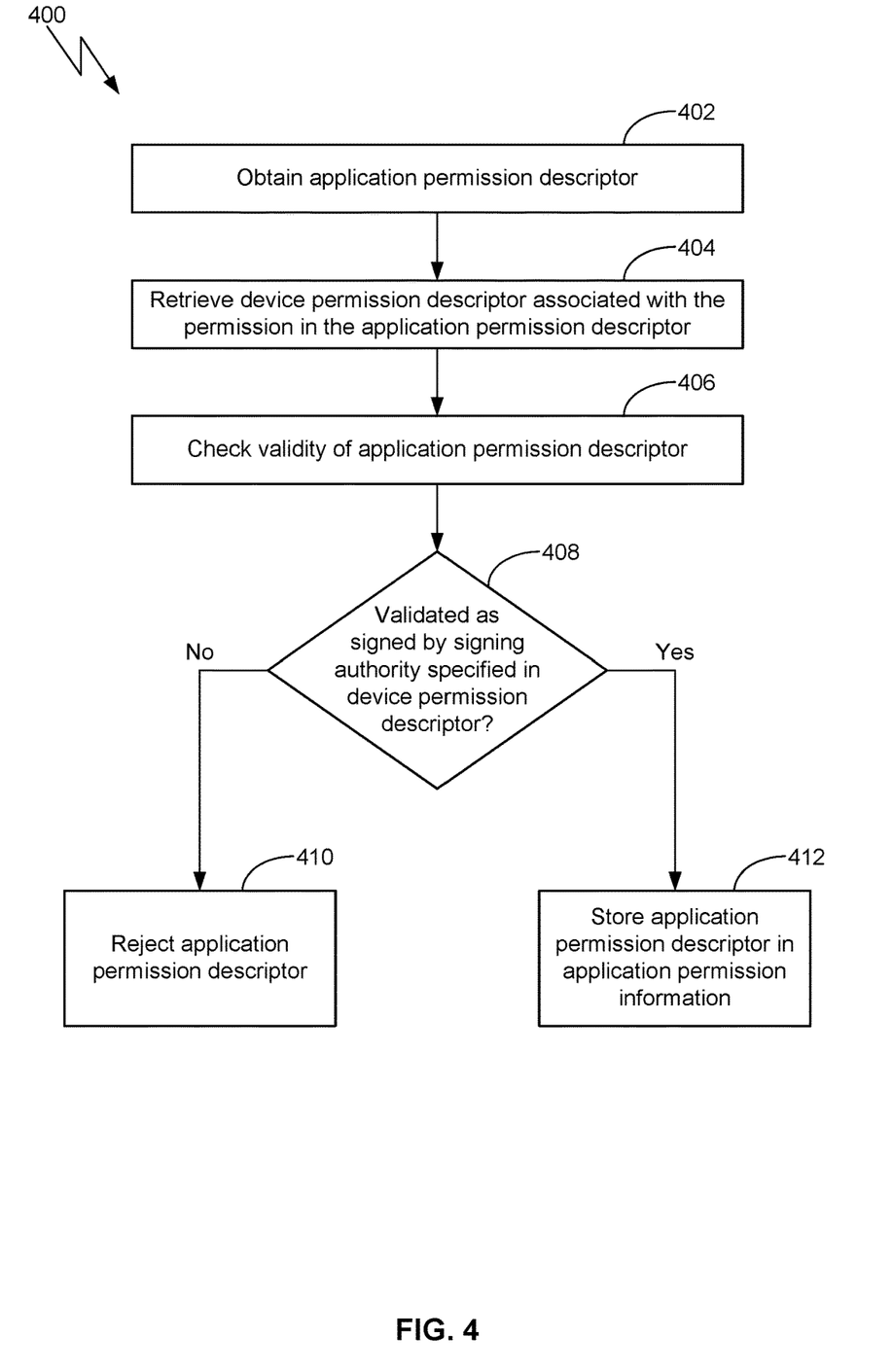
FIG. 4 illustrates a flow diagram of method steps for obtaining an application permission descriptor, according to one or more aspects of the various embodiments.

FIG. 4 illustrates a flow diagram of method steps for obtaining an application permission descriptor, according to one or more aspects of the various embodiments. Although the method steps are described in conjunction with the systems of FIGS. 1-2, persons skilled in the art will understand that any system configured to perform the method steps, in any order, falls within the scope of the various embodiments.

As shown in FIG. 4, a method 400 begins at step 402, where computing device 200 obtains an application permission descriptor 229. Computing device 200 (e.g., permission validator 232 in particular) may receive one or more application permission descriptors 229 via network 250 (e.g., from application provider 106 via an app store) or a local storage medium (e.g., a USB flash drive coupled to I/O device interface 208). Application permission descriptor 229 may be received in conjunction with the corresponding application 234 (e.g., receiving application 234 and application permission descriptor 229 together from an app store for installation) or received separately from application 234 (e.g., as an update from application provider 106 or signing authority 104). Application permission descriptor 229 includes an application permission 136 that is digitally signed by a signing authority 104 and is associated with a resource permission 124 for a resource 122. That is, application permission descriptor 229 includes a digital signature by the signing authority 104. Application permission descriptor 229 may also include a digital signature by application provider 106.

At step 404, permission validator 232 retrieves a device permission descriptor 227 associated with application permission 136 included in application permission descriptor 229. Permission validator 232 retrieves, from storage 214, device permission descriptor 227 that is associated with the same resource permission 124 for resource 122 as application permission 136 in application permission descriptor 229.

At step 406, permission validator 232 checks the validity of device permission descriptor 227. In various embodiments, permission validator 232 checks the validity of application permission descriptor 229 by verifying whether application permission descriptor 229 is digitally signed by a signing authority 104 that is included in device permission descriptor 227 retrieved in step 404. In particular, the digital signature of application permission descriptor 229 is checked against the signing authorities specified in signing authority specification 126 included in device permission descriptor 227 retrieved in step 404. Application permission descriptor 229 may be verified to ensure that the application permission 136 included within is properly approved by a signing authority that is authorized by system provider 102 to grant such approvals. Permission validator 232 may verify the signature by retrieving from certificates 224 one or more certificates associated with the signing authorities specified in the signing authority specification 126 and checking the signature against the certificates associated with the signing authorities specified in the signing authority specification 126. In some embodiments, permission validator 232 may further check that a digital signature of application permission descriptor 229 by application provider 106 is valid, to ensure that application permission descriptor 229 is authentic and properly provided by application 106. Similar to verifying the signature by the signing authority, the signature by application provider 106 may be verified by retrieving from certificates 224 a certificate associated with application provider 106 and checking that signature against the certificate associated with application provider 106.

At step 408, if permission validator 232 determines that application permission descriptor 229 is invalid (step 408—no), then method 400 proceeds to step 410, where permission validator 232 rejects application permission descriptor 229. For example, permission validator 232 may determine that application permission descriptor 229 is not signed at all, and accordingly determine that application permission descriptor 229 is invalid. As additional examples, permission validator 232 may determine that application permission descriptor 229 is not signed by a signing authority specified in signing authority specification 126 included in the retrieved device permission descriptor 227 or by application provider, and accordingly determine that application permission descriptor 229 is invalid. As a further example, permission validator 232 may determine that the signature has expired, and accordingly determine that application permission descriptor 229 is invalid. In some embodiments, that rejection includes permission validator 232 discarding the obtained application permission descriptor 229 and not storing the obtained application permission descriptor 229 in application permission information 228 in storage 214. Accordingly, if a version of application permission descriptor 229 already exists in application permission information 228, that version is maintained and not updated (e.g., not replaced) by the application permission descriptor 229 obtained in step 402. In some embodiments, if a given resource 122 and/or resource permission 124 does not have any corresponding application permission descriptor 229 in storage 214, then resource 122 is inaccessible by applications 234 at computing device 200.

If permission validator 232 determines that application permission descriptor 229 is valid (step 408—yes), then method 400 proceeds to step 412, where permission validator 232 stores application permission descriptor 229 in application permission information 228 in storage 214. For example, permission validator 232 may determine that application permission descriptor 229 is signed by a signing authority specified in signing authority specification 126 included in the retrieved device permission descriptor 227, and the signature has not expired. Accordingly, permission validator 232 determines that application permission descriptor 229 is valid. Optionally, permission validator 232 may further determine that application permission descriptor 229 is additionally signed by application provider 106, and the signature has not expired. Accordingly, permission validator 232 determines that application permission descriptor 229 is valid. Storing application permission descriptor 229 in application permission information 228 may include updating an existing version of application permission descriptor 229 (e.g., a version associated with the same application 234, the same resource permission 124, and the same resource 122) included in application permission information 228 with the obtained application permission descriptor 229. The updating may include, for example, adding or removing conditions associated with application permission 136 and/or changing application permission 136 from granted to denied (or vice versa). Accordingly, method 400 facilitates deployment of new and updated application permissions 136 associated with applications 234 to computing device 200. It should be appreciated that application permission descriptor 229 may be validated using any technically feasible mechanism (e.g., as required by system provider 102 and/or by signing authority 104), whether via digital signatures as described above or via another mechanism. If application permission descriptors 229 are validated via digital signatures, as described above, then an application permission descriptor 229 is required to include a digital signature in order to be validated. That is, an application permission descriptor 229 without a digital signature is invalid and may be rejected as described above in conjunction with step 410.

In some embodiments, permission validator 232 may re-evaluate application permission information 228 periodically, after an update to device permission information 226, and/or after an update to certificates 224. For example, permission validator 232 may re-evaluate application permission information 228 to determine whether any application permission descriptor 229 within has expired, includes a signature associated with a revoked or expired certificate, and/or includes a signature by a signing authority no longer authorized to review requests for the corresponding resource permission 124. If such an application permission descriptor 229 is found, then permission validator 232 may mark that application permission descriptor 229 as invalid and/or remove that application permission descriptor 229 from storage 214.

Figure 5:
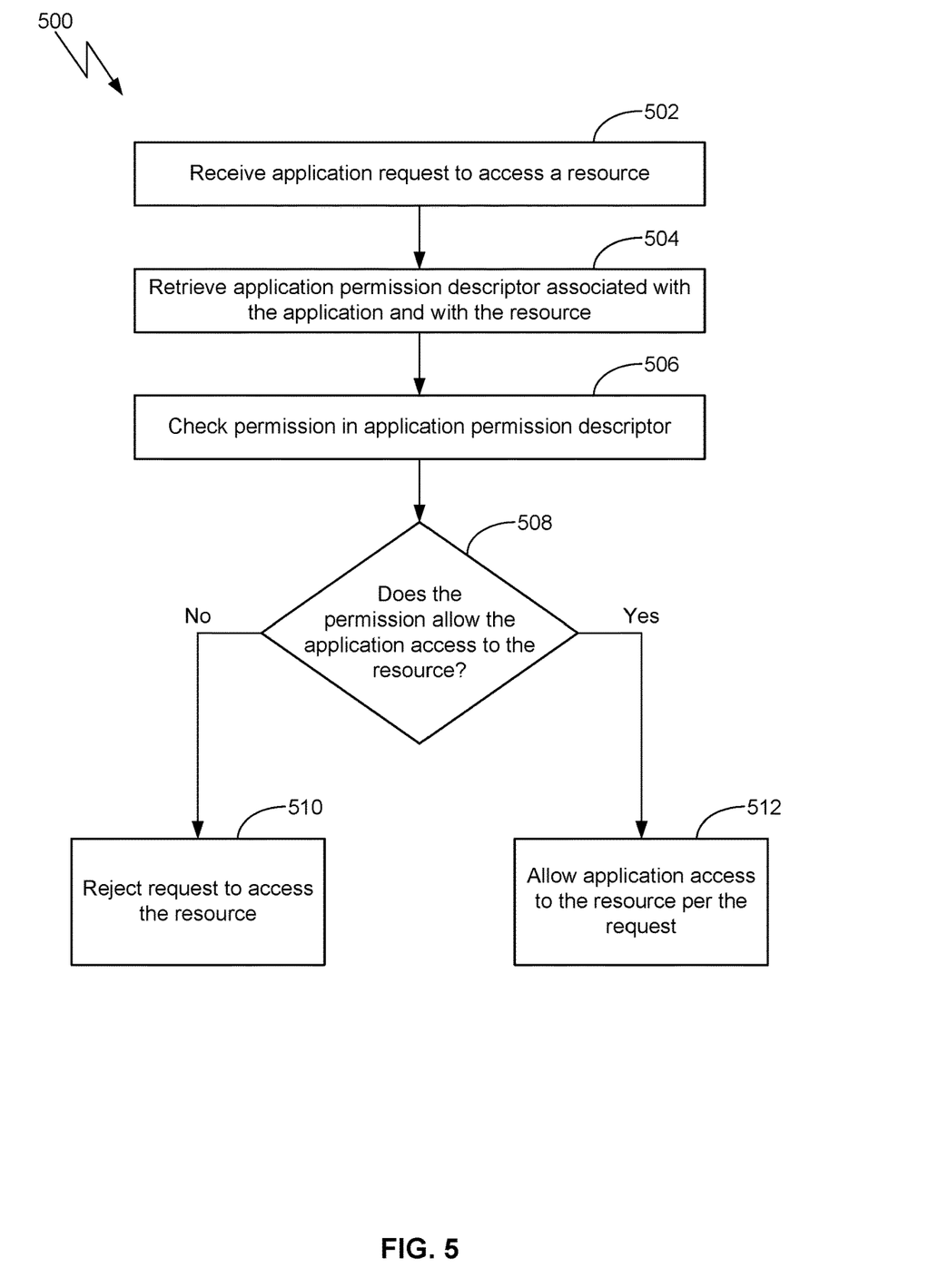
FIG. 5 illustrates a flow diagram of method steps for providing access to a device resource to an application, according to one or more aspects of the various embodiments.

FIG. 5 illustrates a flow diagram of method steps for providing access to a device resource to an application, according to one or more aspects of the various embodiments. Although the method steps are described in conjunction with the systems of FIGS. 1-2, persons skilled in the art will understand that any system configured to perform the method steps, in any order, falls within the scope of the various embodiments.

A method 500 begins at step 502, where permission validator 232 receives an application request to access a resource 122. For example, an application 234 may wish to read a state of the parking brake. Accordingly, application 234 makes a request for the state of the parking brake in any technically feasible manner (e.g., via an API, a function call, etc.). An operating system at computing device 200 may forward the request to permission validator 232 to check whether application 234 has the permission to access the state of the parking brake.

At step 504, permission validator 232 retrieves application permission descriptor 229 associated with application 234 and resource 122. For example, in response to receiving the request to access the parking brake state by application 234, permission validator 232 retrieves an application permission descriptor 229 that is associated with application 234 and with the resource of the parking brake state.

At step 506, permission validator 232 checks application permission 136 in the application permission descriptor 229 retrieved in step 504. In particular, permission validator 232 checks whether application 234 has been granted, in application permission 136, permission to access the resource of the parking brake state. Permission validator 232 may further check any conditions/constraints/policies specified in application permission descriptor 229 against any data associated with computing device 200 and relevant to the conditions/constraints/policies (e.g., a state of the vehicle, a region or locale associated with the vehicle).

At step 508, if permission validator 232 determines that application permission 136 denies application 234 permission to access resource 122 (step 508—no), then method 500 proceeds to step 510, where permission validator 232 rejects the request by application 234 to access resource 122. Permission validator 232 may reject the request because, for example, application permission 136 denies permission to application 234 to access the resource 122, and/or a condition/constraint/policy associated with the access is not satisfied. Permission validator 232 may generate and return a rejection message or signal to application 234 (e.g., via the operating system). Application 234 may re-attempt the access (e.g., making a new request) at a later time, give up, and/or prompt a user (e.g., present an error message to the user) for further instruction.

If permission validator 232 determines that application permission 136 grants application 234 permission to access resource 122, and that the conditions/constraints/policies on the access, if any, are satisfied (step 508—yes), then method 500 proceeds to step 512, where permission validator 232 allows or grants the request by application 234 to access resource 122. Permission validator 232 may generate and return an allowance message or signal to application 234 (e.g., via the operating system). Application 234 may then proceed to access resource 122 in accordance with the allowance message or signal.

In sum, a permissions validation framework may be implemented at a computing device or system to more efficiently manage application permissions at the computing device or system. A computing device may receive and store a set of device permissions, which includes a mapping of a permission to access a device resource to one or more signing authorities that are allowed to approve an application request for that permission. When an application is installed on the computing device, the computing device determines that a signing authority that signed a request by the application for the permission matches a signing authority to which the permission is mapped within the set of device permissions. Based on this determination and the signed permission, the computing device may approve a request by the application to the resource.

One advantage of the disclosed techniques is that permissions requested by third-party applications at a computing device may be approved without requiring a direct response by a user. Accordingly, the level of knowledge required by users to utilize third-party applications may be reduced. Another advantage is that access to device resources may be controlled (e.g., expanded or contracted) more efficiently by an implementer of the computing device by at least reducing or removing the burden on a single entity within the implementer to understand and review permissions associated with a multitude of device resources and/or associated with applications from a multitude of developers. Accordingly, the implementer can more efficiently respond to problems associated with access to certain device resources. A further advantage is that permissions for different groups of device resources may be managed separately, which facilitates variations in the standards of review and degrees of privilege for permissions for different groups and/or types of device resources.

1. In some embodiments, a computer-implemented method for managing access to a resource at a device comprises receiving a first request by a first application to access a resource; determining that a first application permission associated with the first application and the resource grants the first application access to the resource, wherein the first application permission includes a first signature of a first permission review entity associated with the resource; and granting the first request to access the resource based on the first application permission.

2. The method of clause 1, further comprising receiving a second request by a second application to access the resource; determining that a second application permission associated with the second application and the resource denies the second application access to the resource; and rejecting the second request to access the resource based on the second application permission.

3. The method of clauses 1 or 2, wherein the second application permission includes a second signature of the first permission review entity.

4. The method of any of clauses 1-3, wherein the second application permission includes a second signature of a second permission review entity associated with the resource, wherein the second permission review entity is distinct from the first permission review entity.

5. The method of any of clauses 1-4, wherein the first application permission is associated with one or more access conditions, and wherein determining that the first application permission grants the first application access to the resource comprises determining that the one or more access conditions are satisfied.

6. The method of any of clauses 1-5, further comprising obtaining first device permission information; and based on determining that the first device permission information includes a signature of a system provider entity associated with the device: determining that the first device permission information is valid, and storing the first device permission information in a memory of the device.

7. The method of any of clauses 1-6, further comprising obtaining second device permission information; and based on determining that the second device permission information does not include a signature of the system provider entity associated with the device, determining that the second device permission information is invalid.

8. The method of any of clauses 1-7, wherein the first device permission information specifies a set of one or more permission review entities associated with the resource.

9. The method of any of clauses 1-8, further comprising, based on determining that the first permission review entity is included in the set of one or more permission review entities, determining that the first application permission is valid.

10. In some embodiments, one or more non-transitory computer-readable storage media stores instructions, that, when executed by one or more processors, cause the one or more processors to perform the steps of obtaining a first application permission associated with a first application and a first resource; based on determining that the first application permission includes a signature of a first permission review entity included in a set of one or more permission review entities associated with the first resource, determining that the first application permission is valid; and granting the first application access to the first resource based on the first application permission.

11. The one or more computer-readable storage media of clause 10, wherein the first application permission is associated with one or more access conditions, and wherein granting the first application access to the resource comprises granting the first application access based on determining that the one or more access conditions are satisfied.

12. The one or more computer-readable storage media of clauses 10 or 11, wherein the instructions, when executed by the one or more processors, further cause the one or more processors to perform the steps of obtaining a second application permission associated with the first application and a second resource; and based on determining that the second application permission includes a signature of a second permission review entity not included in a set of one or more permission review entities associated with the second resource, determining that the second application permission is invalid.

13. The one or more computer-readable storage media of any of clauses 10-12, wherein the instructions, when executed by the one or more processors, further cause the one or more processors to perform the steps of obtaining device permission information; determining that the device permission information includes a signature of a system provider entity associated with the device; and based on the determination that the device permission information includes the signature of the system provider entity: determining that the device permission information is valid, and storing the device permission information in a memory of the device.

14. The one or more computer-readable storage media of any of clauses 10-13, wherein the set of one or more permission review entities associated with the first resource are included in the device permission information.

15. The one or more computer-readable storage media of any of clauses 10-14, wherein the device permission information is obtained via the system provider entity.

16. The one or more computer-readable storage media of any of clauses 10-15, wherein the first application permission is obtained via an application provider entity associated with the first application.

17. The one or more computer-readable storage media of any of clauses 10-16, wherein the first application permission is obtained via the first permission review entity.

18. In some embodiments, a system comprises a memory storing instructions; and at least one processor coupled to the memory and, when executing the instructions, is configured to receive a first request by a first application to access a resource; determine that a first application permission associated with the first application and the resource grants the first application access to the resource, wherein the first application permission includes a first signature of a first permission review entity associated with the resource; and grant the first request to access the resource based on the first application permission.

19. The system of clause 18, wherein the at least one processor, when executing the instructions, is further configured to obtain device permission information; and based on determining that the device permission information includes a signature of a system provider entity associated with the device: determine that the device permission information is valid, and store the device permission information in the memory; wherein the set of one or more permission review entities associated with the first resource are included in the device permission information.

20. The system of clauses 18 or 19, wherein the at least one processor, when executing the instructions, is further configured to determine that the first application permission is valid based on the first signature of the first permission review entity.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for managing access to resources at a device, comprising:
   receiving a first request by a first application to access a first resource associated with a first level of access to a first subsystem of the device, wherein a second resource is associated with a second level of access to the first subsystem that is greater than the first level of access;
   receiving a first application permission associated with the first application and the first resource, wherein the first application permission includes a first signature of a first permission review entity;
   determining that the first application permission grants the first application the first level of access to the first subsystem based on verifying that the first permission review entity is included in a first list of a first descriptor associated with the first resource that lists permission review entities that are authorized to review applications for permission to have the first level of access to the first subsystem, wherein a second list of a second descriptor associated with the second resource lists permission review entities that are authorized to review applications for permission to have the second level of access to the first subsystem, wherein the second list is different from the first list; and
   granting the first request to access the first resource based on the first application permission.

2. The method of claim 1, further comprising:
   receiving a second request by a second application to access the first resource;
   determining that a second application permission associated with the second application and the first resource denies the second application access to the first resource; and
   rejecting the second request to access the first resource based on the second application permission.

3. The method of claim 2, wherein the second application permission includes a second signature of the first permission review entity.

4. The method of claim 2, wherein the second application permission includes a second signature of a second permission review entity associated with the first resource, wherein the second permission review entity is distinct from the first permission review entity.

5. The method of claim 1, wherein the first application permission is associated with one or more access conditions, and wherein determining that the first application permission grants the first application access to the first resource comprises determining that the one or more access conditions are satisfied.

6. The method of claim 1, further comprising:
   obtaining first device permission information; and based on determining that the first device permission information includes a signature of a system provider entity associated with the device:
determining that the first device permission information is valid, and storing the first device permission information in a memory of the device.

7. The method of claim 6, further comprising:
obtaining second device permission information; and
based on determining that the second device permission information does not include a signature of the system provider entity associated with the device, determining that the second device permission information is invalid.

8. The method of claim 6, wherein the first device permission information specifies the first list of the first descriptor that lists the permission review entities that are authorized to review applications for permission to have the first level of access to the first subsystem.

9. The method of claim 8, further comprising, based on determining that the first permission review entity is included in the first list of the first descriptor that lists the permission review entities, determining that the first application permission is valid.

10. One or more non-transitory computer-readable storage media storing instructions, that, when executed by one or more processors, cause the one or more processors to perform the steps of:
obtaining a first application permission associated with a first application and a first resource associated with a first level of access to a first subsystem of a device, wherein a second resource is associated with a second level of access to the first subsystem that is greater than the first level of access;
based on determining that the first application permission includes a signature of a first permission review entity included in a first list of a first descriptor associated with the first resource that lists permission review entities that are authorized to review applications for permission to have the first level of access to the first subsystem, determining that the first application permission is valid, wherein a second list of a second descriptor associated with the second resource lists permission review entities that are authorized to review applications for permission to have the second level of access to the first subsystem, wherein the second list is different from the first list; and
granting the first application access to the first resource based on the first application permission.

11. The one or more computer-readable storage media of claim 10, wherein the first application permission is associated with one or more access conditions, and wherein granting the first application access to the first resource comprises granting the first application access based on determining that the one or more access conditions are satisfied.

12. The one or more computer-readable storage media of claim 10, wherein the instructions, when executed by the one or more processors, further cause the one or more processors to perform the steps of:
obtaining a second application permission associated with the first application and the second resource; and
based on determining that the second application permission includes a signature of a second permission review entity not included in the second list of the second descriptor that lists permission review entities associated with the second resource, determining that the second application permission is invalid.

13. The one or more computer-readable storage media of claim 10, wherein the instructions, when executed by the one or more processors, further cause the one or more processors to perform the steps of:
obtaining device permission information;
determining that the device permission information includes a signature of a system provider entity associated with the device; and
based on the determination that the device permission information includes the signature of the system provider entity:
determining that the device permission information is valid, and
storing the device permission information in a memory of the device.

14. The one or more computer-readable storage media of claim 13, wherein the first list of the first descriptor that lists the permission review entities that are authorized to review applications for permission to have the first level of access to the first subsystem is included in the device permission information.

15. The one or more computer-readable storage media of claim 13, wherein the device permission information is obtained via the system provider entity.

16. The one or more computer-readable storage media of claim 10, wherein the first application permission is obtained via an application provider entity associated with the first application.

17. The one or more computer-readable storage media of claim 10, wherein the first application permission is obtained via the first permission review entity.

18. A system, comprising:
a memory storing instructions; and
at least one processor coupled to the memory and, when executing the instructions, is configured to:
receive a first request by a first application to access a first resource associated with a first level of access to a first subsystem of a device, wherein a second resource is associated with a second level of access to the first subsystem that is greater than the first level of access;
receive a first application permission associated with the first application and the first resource, wherein the first application permission includes a first signature of a first permission review entity;
determine that the first application permission grants the first application the first level of access to the first subsystem based on verifying that the first permission review entity is included in a first list of a first descriptor associated with the first resource that lists permission review entities that are authorized to review applications for permission to have the first level of access to the first subsystem, wherein a second list of a second descriptor associated with the second resource lists permission review entities that are authorized to review applications for permission to have the second level of access to the first subsystem, wherein the second list is different from the first list; and
grant the first request to access the first resource based on the first application permission.

19. The system of claim 18, wherein the at least one processor, when executing the instructions, is further configured to:
obtain device permission information; and based on determining that the device permission information includes a signature of a system provider entity associated with the device:
determine that the device permission information is valid, and
store the device permission information in the memory;
wherein the device permission information includes the first list of the first descriptor that lists the permission review entities that are authorized to review applications for permission to have the first level of access to the first subsystem, wherein the first permission review entity is included in the first list of the first descriptor that lists the permission review entities that are authorized to review applications for permission to have the first level of access to the first subsystem.

20. The system of claim 18, wherein the at least one processor, when executing the instructions, is further configured to determine that the first application permission is valid based on the first signature of the first permission review entity.

\* \* \* \* \*